(12) United States Patent
Czarnetzki

(10) Patent No.: US 7,168,268 B2
(45) Date of Patent: Jan. 30, 2007

(54) METHOD FOR THE PRODUCTION OF COLORED STRUCTURES OF A GLASS

(75) Inventor: Walter Czarnetzki, Meddewade (DE)

(73) Assignee: Sator Laser GmbH (DE)

( * ) Notice: Subject to any disclaimer, the term of this patent is extended or adjusted under 35 U.S.C. 154(b) by 283 days.

(21) Appl. No.: 10/474,645

(22) PCT Filed: Apr. 17, 2002

(86) PCT No.: PCT/EP02/04257

§ 371 (c)(1),
(2), (4) Date: Apr. 26, 2004

(87) PCT Pub. No.: WO02/083589

PCT Pub. Date: Oct. 24, 2002

(65) Prior Publication Data

US 2004/0168471 A1   Sep. 2, 2004

(30) Foreign Application Priority Data

Apr. 18, 2001 (DE) .................................. 101 18 876

(51) Int. Cl.
C03C 21/00 (2006.01)

(52) U.S. Cl. .............. 65/30.11; 65/30.13; 65/32.4; 65/60.7; 430/292; 427/555; 427/597

(58) Field of Classification Search ............... 65/29.1, 65/29.12, 29.18, 30.1, 30.11, 30.13, 32.1, 65/32.3, 32.4, 33.2, 33.4, 33.5, 60.1, 60.4, 65/60.51, 60.7; 430/270.1, 292, 298, 321, 430/341, 121.6; 219/121.61, 121.6; 427/529, 427/554, 555, 596, 597, 226, 229
See application file for complete search history.

(56) References Cited

U.S. PATENT DOCUMENTS

| | | | |
|---|---|---|---|
| 2,732,298 A * | 1/1956 | Stookey ....................... 430/348 |
| 4,769,310 A | 9/1988 | Gugger et al. |
| 5,030,551 A | 7/1991 | Herren et al. |
| 5,091,003 A * | 2/1992 | Boaz ........................ 106/31.05 |
| 5,194,079 A | 3/1993 | Tumminelli et al. |
| 5,206,496 A | 4/1993 | Clement et al. |

FOREIGN PATENT DOCUMENTS

| | | |
|---|---|---|
| DE | 215 776 A1 | 11/1984 |
| DE | 40 13 300 A1 | 11/1992 |
| DE | 199 26 878 A1 | 12/1999 |
| DE | 198 41 547 * | 3/2000 |
| DE | 198 41 547 A1 | 3/2000 |
| EP | 0 531 584 A1 | 3/1993 |
| EP | 0 861155 B1 | 10/2000 |
| WO | 95/25639 | 9/1995 |

OTHER PUBLICATIONS

Kleine Teilchen, große Wirkung; DE-Z Glaswelt Jun. 2000; 4 pages—pp. 46, 48, 50 and 51.

* cited by examiner

Primary Examiner—Eric Hug
(74) Attorney, Agent, or Firm—Peter J. Bilinski

(57) ABSTRACT

A method for the manufacture of colored structures of a glass, particularly for applying an inscription to the glass, by locally heating volume elements of the glass by means of a laser beam. The glass contains ions of metals which, in the form of submicroscopic particles, color the glass wherein the local heating of the non-doped glass is accomplished through a solution or gel of a metallic salt which transmits the laser beam well and is directly contacted with a surface of the glass.

8 Claims, No Drawings

METHOD FOR THE PRODUCTION OF COLORED STRUCTURES OF A GLASS

FIELD OF THE INVENTION

This invention respectively relates to the manufacture of colored structures of a glass, particularly for applying an inscription to the glass.

BACKGROUND OF THE INVENTION

It is known to bring about colored structures, e.g. inscriptions on a glass, by applying a paste containing metallic salts to the glass surface by mask, screen or dabber printing in the desired structure via a subsequent heat treatment. Metallic ions were incorporated into the glass layer adjacent to the surface (by doping) before; they are reduced to atoms, which coalesce to form metallic particles (coagulation), by reducing agents contained in the glass and under the influence of a temperature. DE 40 13 300 discloses a practical application of this method to apply an inscription to a windscreen for automobiles in which a filter strip which attenuates light and heat irradiation is imprinted by means of the screen printing technique. The known method uses this technology in coloring glasses in which additives in the form of metallic salts are admixed to a glass melt. During a subsequent annealing, via ion exchange processes near the glass surface, reducing agents in the glass help cause the formation of atoms, which coalesce into metallic particles, thus bringing about a coloration. Gold, copper, and silver salts or their atoms are particularly suited for coloring the glass in the visible spectral range. Disadvantages of the known inscription method are the relative high labor consumption because of a plurality of production steps and the need to manufacture appropriate masks for each structure desired. Moreover, the colored structures which can be produced in this manner are confined, in their minimum possible size and also pin precision, by the masks and the diffusion process so that this way makes it impossible to produce colored structures having dimensions in the μm range.

It is further known to use laser beams for producing colored structures and engravings having dimensions up to the μm range on surfaces of glass, plastics, metals, ceramics, etc. These methods rely on a local destruction of the surface structure by material erosion, evaporation, melting or burning in foreign material. Local destructions of the surface structure result in a decrease in the mechanical stressability of glass that cannot be accepted for many applications. Moreover, the structures are directly on the surface of the glass and, hence, can be easily attacked both mechanically and chemically.

U.S. Pat. No. 4,769,310 has made known a method for the production of markings in ceramics or glasses that contain inorganic compounds sensitive to irradiation. The markings produced by this method are also located in layers adjacent to the surface.

U.S. Pat. No. 5,206,496 discloses a method for the production of structures which not only are flat-spread, but also spatial, in the volumes of randomly shaped transparent bodies. A focussed beam of a high energy density, for which the material is transparent, is directed onto a body made of glass or plastic. In the focus which is in the interior of the body, because of the non-linear optical properties which become efficient only at very high energy densities, the beam causes an ionization of the material and, ultimately, locally confined damage to the material without appreciably modifying the areas outside the focus and the surface of the body. Such damage leads to an extinction in the processed areas which is more intense as compared to the processing material. The increased extinction is provoked by microfissures which scatter incident light, thus making visible the location at which the focus has been. This is a way to produce predetermined structures by a relative movement between the body and focus.

DE 198 41 547 has made it known to produce a variety of colored structures having one, two or three dimensions in the interior of glasses without impairing the mechanical properties of the glass. This is achieved by the fact that such particles are precipitated in small volume elements at any point in the glass which contains ions of metals which color the glass in the form of submicroscopic particles, and the desired color structure is built up by lining up volume elements colored in this way. A locally limited heating of the volume elements can limit the formation of particles to these. Therefore, the known method relies on the production of markings, structures or inscriptions on glasses by means of a laser beam. However, this presupposes that the glasses were been doped before, i.e. contain ions of metals. As mentioned initially this can be achieved by admixing appropriate additives to the molten glass or a paste containing metallic salts is applied to the glass, whereupon a subsequent annealing causes metallic ions to migrate into a layer adjacent to the boundary layer via ion exchange processes and diffusion.

DD 215 776 A1 has made known a method for the manufacture of colored images on glass. The method heats diffusion ink by laser beams simultaneously with the glass surface in accordance with the contours envisaged for the image. On the heated glass surface, the diffusion ink gets into the glass by convection and diffusion, which produces a durable acid-proof and caustic-proof ink track. The disadvantage of this known method is that the glass surface is caused to melt and, thus, its mechanical stability is impaired.

SUMMARY OF THE INVENTION

It is the object of the invention to indicate a method for the manufacture of colored structures of a glass, particularly for applying an inscription to the glass which, in the known manner described above, also by means of a laser beam, produces submicroscopic particles to the area adjacent to the boundary layer by locally confined heating, which particles are built up into a desired structure by lining up colored volume elements, with no need to incorporate metallic ions into the glass before.

DETAILED DESCRIPTION

In the inventive method, the non-doped glass is locally heated through a solution or gel of a metallic salt that transmits the laser beam well and is contacted directly with a surface of the glass. This action is based on the finding that the glass can be locally doped with metallic ions by means of the laser beam, on one hand, i.e. only at points where they are needed, and ion exchange processes help reduce atoms, which form the repeatedly mentioned metallic particles, in the glass area adjacent to the boundary layer, on the other. Thus, in the inventive process, the doping and inscription or marking or structure formation are performed in a single step, which requires very little expenditure all the more so as a large-volume doping of the glass as is applied in conventional methods becomes unnecessary. In the inventive method, the temperature of heating in the area to be colored is lower than a temperature required to cause the surface to melt. This way helps avoid weakening the stability of the glass so that the method is particularly suited for marking windscreens and other panes on motor vehicles. For example, the marking of the panes may be made with a definite number such as the chassis identification number, for the purpose of theft prevention.

An According to an alternative solution for the inventive object is indicated in claim 9. accordingly, the non-doped glass is can be locally heated through a substrate which contains a metallic salt, transmits the laser beam well, and is directly contacted with a surface of the glass. The process taking place here is the same as described above.

According to an aspect of the invention, the solution or gel covers the glass surface in a thin layer or a film. The film or layer may be locally sprayed onto the glass at points where an inscription, marking or the like is desirable. Alternatively, the gel or solution may be spread-coated on the glass. However, it is also possible to dip the glass into a solution bath. What is essential, however, is that the solution or gel be sufficiently transparent to allow sufficient energy to be fed into the glass to achieve particle formation.

According to another aspect of the invention, it is also imaginable to apply the solution or gel as a layer to a sheet which subsequently is contacted with the glass surface. The solution or gel may form a unity with the sheet which, e.g. for reasons of protection, is covered with a protective layer which is removed before the sheet is contacted with the glass surface. It is understood that the sheet also has to present sufficient properties to transmit the laser beam. This naturally applies also to the case that the metallic salt is incorporated into a sheet as is proposed in claim 9.

The metallic salts considered for use include silver nitrate, gold nitrate, copper nitrate or copper nitrite, or halogen salts such as bromides, chlorides, fluorides with metals. The color is determined by the metal chosen as is known per sé. Conventional laser sources may be used to generate the laser beam, even $CO_2$ lasers which are only conditionally suited for engraving glass. $CO_2$ lasers involve particularly little expenditure in manufacture. The inventive method is specifically suited for marking or applying inscriptions to glass, e.g. automobile panes, and makes impossible an undesirable, non-visible removal and/or manipulation of the inscription.

I claim:

1. A method for the manufacture of colored structures in a glass surface, particularly for applying an inscription to the glass, comprising the steps of:

providing the glass surface of a non-doped glass with a solution or gel of a metallic salt suited for coloring glass that transmits the laser beam well, wherein only a local surface area of the glass is contacted with the gel or solution;

directing a laser beam onto the solution or gel on the surface of the glass in an area to be colored, the solution or gel being transparent to the wavelength of the laser light; and heating the area to be colored by the incident laser light, wherein the temperature of heating in the area to be colored is lower than a temperature required for causing the surface to melt.

2. The method according to claim 1, wherein the solution or gel covers the glass surface only in a thin layer or film.

3. The method according to claim 2, wherein the solution or gel is sprayed onto the glass.

4. The method according to claim 2, wherein the solution or gel is spread-coated on the glass.

5. The method according to claim 1, wherein the glass is dipped into a solution bath.

6. The method according to claim 1, wherein the solution or gel is applied as a layer to a sheet which subsequently is contacted with the glass surface.

7. A method for the manufacture of colored structures in a glass surface, particularly for applying an inscription to the glass, comprising the steps of:

contacting a substrate containing a solution of a metallic salt suited for coloring glass directly with a surface of a non-doped glass with the substrate transmitting the laser beam well; and heating an area to be colored by means of incident laser light, wherein a laser beam is directed onto the surface through the substrate and the substrate is transparent to the laser beam, and the temperature of heating in the area to be colored is lower than the temperature required for causing the surface to melt.

8. The method according to claim 7, wherein a plastic sheet transparent to the wavelengths of the laser light is used as a substrate.

* * * * *